Patented July 28, 1936

UNITED STATES PATENT OFFICE 2,048,962

COMPOSITION OF CALCIUM CARBIDE

John B. A. G. Neumann, Maracaibo, Venezuela

No Drawing. Application June 25, 1934, Serial No. 732,384

2 Claims. (Cl. 23—242)

This invention relates to a composition of calcium carbide and has for an object to provide an improved calcium carbide composition that will maintain its strength uniformly so that it will not deteriorate with age or through the presence of moisture in the atmosphere and in addition thereto, when used for lighting purposes, the flame will not flare up, but instead will burn much more uniformly than with the ordinary unprepared calcium carbide.

A further object of this invention is to provide a calcium carbide composition that will provide a better and more uniform quality of acetylene gas for burning or other purposes.

Still a further object of this invention is to provide a calcium carbide composition that may be easily prepared in several ways as hereinafter described and which may be prepared inexpensively and economically with the use of existing machinery.

With the foregoing and other objects in view, as will hereinafter become apparent, this invention includes the composition of matter as hereinafter described and claimed.

It is difficult to store or preserve calcium carbide in its pure form for the purpose of using the same for generating acetylene gas because of the fact that the calcium carbide tends to collect moisture from the atmosphere and this moisture causes a generation of acetylene thereby wasting the gas thus being generated at times when it is not desired, and in addition, creating a fire hazard. This problem has been previously recognized; many elaborate and expensive or complicated compositions, including calcium carbide, have been made before in connection with this problem. While such previous compositions may have been successful in that they eliminate a deterioration of the calcium carbide, they do so at too high a cost both from a standpoint of the labor or process involved in preparing such complicated composition. In addition thereto, the cost of the additional material used in making up the complicated compositions are more or less expensive.

The materials used in preparing the composition of this invention however are very simple and uncomplicated. Both the cost of the added materials is very low and the cost of preparing the composition of this invention with this material is very low. Further the calcium carbide composition of this invention has added thereto only a single material, a material belonging to the general class of petroleum distillate and including gasoline, benzine, benzol, kerosene, stove oil, or other similar distillates.

This invention consists simply one part of petroleum distillate to twenty-four parts of calcium carbide ($CaC_2$). The composition thus includes about four per cent of petroleum distillate such as gasoline, or the other materials above named. The percentage of distillate named is not an absolute percentage but an approximate percentage and may vary within slight limits depending on atmospheric and climatic conditions according to where the composition is to be stored and used. A somewhat higher percentage of distillate will be used in regions of higher humidity.

The composition may be made by spraying the gasoline or other distillate over the pure calcium carbide so as to form a thin coating over the outer surface thereof. Another manner of preparing the composition of this invention is to place the calcium carbide in a revolving drum and spraying or sprinkling gasoline or other distillate into the drum as the calcium carbide is revolved therein similar to the manner that concrete is mixed.

The main purpose to be borne in mind when preparing the composition of this invention is that the entire surface of the calcium carbide should be coated with a thin coating of gasoline or other distillate, the coating thereby acting to prevent access of the moisture in the atmosphere to the calcium carbide thus preventing the calcium carbide from deteriorating or prematurely generating the gas and preserving the calcium carbide indefinitely until it is ready for use in the usual manner. The calcium carbide composition thus prepared not only preserves the quality thereof indefinitely but has the additional advantage that when used for generating acetylene for lighting purposes, the flame will not flare up but will burn much more uniformly due no doubt to the fact that as the acetylene is generated in the usual manner it tends to carry with it some of the distillate and at the same time tends to prevent any moisture being carried thereby, thus providing more uniform and better flames.

The novel features and the operation of this device will be apparent from the foregoing description. While the composition has been described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. As a new composition of matter, calcium carbide sprayed with a distillate of petroleum, said distillate comprising approximately four per cent of said composition.

2. As a new composition of matter, approximately twenty-four parts of calcium carbide and approximately one part of petroleum distillate, said petroleum distillate forming a thin coating about all the exposed surfaces of said calcium carbide.

JOHN B. A. G. NEUMANN.